US008631080B2

(12) United States Patent
Goodman et al.

(10) Patent No.: US 8,631,080 B2
(45) Date of Patent: Jan. 14, 2014

(54) EMAIL CHARACTERIZATION

(75) Inventors: Robert F. Goodman, Allston, MA (US); Michael R. Gretzinger, Malden, MA (US); John R. Burkhardt, Arlington, MA (US); Rachel R. Schiff, Cambridge, MA (US); Barnaby M. Claydon, Hingham, MA (US); Katherine W. Rae, Brookline, MA (US); Reed P. Sturtevant, Lexington, MA (US)

(73) Assignee: Microsoft Corporation, Redmond, WA (US)

( * ) Notice: Subject to any disclaimer, the term of this patent is extended or adjusted under 35 U.S.C. 154(b) by 186 days.

(21) Appl. No.: 12/402,735

(22) Filed: Mar. 12, 2009

(65) Prior Publication Data
US 2010/0235447 A1  Sep. 16, 2010

(51) Int. Cl.
G06F 15/00 (2006.01)
(52) U.S. Cl.
USPC ........... 709/206; 709/207; 709/225; 709/238; 709/242; 709/246
(58) Field of Classification Search
USPC .................. 709/206, 207, 225, 238, 242, 246
See application file for complete search history.

(56) References Cited

U.S. PATENT DOCUMENTS

| 6,704,772 | B1 | | 3/2004 | Ahmed et al. |
| 6,721,748 | B1 | * | 4/2004 | Knight et al. ........................... 1/1 |
| 6,964,017 | B1 | * | 11/2005 | Meisner et al. ............... 715/205 |
| 6,973,577 | B1 | | 12/2005 | Kouznetsov |
| 7,177,909 | B2 | * | 2/2007 | Stark et al. .................... 709/206 |
| 7,237,009 | B1 | * | 6/2007 | Fung et al. .................... 709/206 |
| 7,328,244 | B1 | * | 2/2008 | Kelley .......................... 709/206 |
| 7,386,892 | B2 | | 6/2008 | Gilfix et al. |
| 7,409,708 | B2 | | 8/2008 | Goodman et al. |
| 7,421,498 | B2 | | 9/2008 | Packer |
| 7,457,844 | B2 | | 11/2008 | Miller et al. |
| 7,493,403 | B2 | | 2/2009 | Shull et al. |
| 7,511,723 | B2 | * | 3/2009 | Sylthe et al. .................. 345/671 |
| 7,523,095 | B2 | * | 4/2009 | Gates et al. ........................... 1/1 |
| 7,548,956 | B1 | | 6/2009 | Aoki et al. |
| 7,580,984 | B2 | * | 8/2009 | Malik .......................... 709/206 |

(Continued)

OTHER PUBLICATIONS

Ramaraj, et al., "Automated Classification of Customer Emails via Association Rule Mining", Retrieved at <<http://www.scialert.net/qredirect.php?doi=itj.2007.567.572&linkid=pdf>>, Information Technology Journal 6(4), 2007, pp. 567-572.

(Continued)

Primary Examiner — Rupal Dharia
Assistant Examiner — Van Kim T Nguyen
(74) Attorney, Agent, or Firm — Microsoft Corporation

(57) ABSTRACT

Email users may feel overwhelmed with the abundance of emails they receive. Many current email management techniques require at least some manual intervention that may be time consuming and/or otherwise frustrating to a user. As provided herein, emails may be characterized based upon content of the email and domain classification data (e.g., a company name, business category, or a website name associated with the domain name of the sender). One or more viewing panels may be populated with the characterized emails. A viewing panel may present emails corresponding to a particular characterization (e.g., a shopping viewing panel may display emails characterized as shopping). To enhance characterization, rules used to characterize emails may learn from a user's actions. For example, a user may move an email from a shopping viewing panel to a travel viewing panel, thus altering the characterization of the email from shopping to travel.

20 Claims, 10 Drawing Sheets

(56) References Cited

U.S. PATENT DOCUMENTS

| | | | | |
|---|---|---|---|---|
| 7,599,992 B2* | 10/2009 | Nakajima | | 709/206 |
| 7,640,322 B2 | 12/2009 | Wendkos et al. | | |
| 7,707,255 B2* | 4/2010 | Satterfield et al. | | 709/206 |
| 7,711,743 B2* | 5/2010 | Cavagnaro et al. | | 707/769 |
| 7,716,297 B1 | 5/2010 | Wittel et al. | | |
| 7,734,670 B2* | 6/2010 | Poozhiyil et al. | | 707/608 |
| 7,779,079 B2 | 8/2010 | Nichols et al. | | |
| 7,779,472 B1 | 8/2010 | Lou | | |
| 7,797,733 B1 | 9/2010 | Sallam | | |
| 7,844,678 B2 | 11/2010 | Malik | | |
| 7,849,103 B2* | 12/2010 | Hyatt et al. | | 707/792 |
| 7,877,806 B2 | 1/2011 | Repasi et al. | | |
| 7,882,189 B2* | 2/2011 | Wilson et al. | | 709/206 |
| 7,882,542 B2 | 2/2011 | Neystadt et al. | | |
| 7,921,174 B1 | 4/2011 | Denise | | |
| 7,934,254 B2 | 4/2011 | Graham | | |
| 8,024,266 B1 | 9/2011 | Barber | | |
| 8,141,133 B2 | 3/2012 | Pagan | | |
| 8,171,388 B2 | 5/2012 | Zaltzman et al. | | |
| 8,306,256 B2 | 11/2012 | Muriello et al. | | |
| 8,321,516 B2 | 11/2012 | Sargent et al. | | |
| 2002/0143784 A1 | 10/2002 | Sluiman | | |
| 2004/0071090 A1 | 4/2004 | Corson et al. | | |
| 2004/0122926 A1 | 6/2004 | Moore et al. | | |
| 2005/0004989 A1 | 1/2005 | Satterfield et al. | | |
| 2005/0030643 A1 | 2/2005 | Gal et al. | | |
| 2005/0050150 A1* | 3/2005 | Dinkin | | 709/207 |
| 2005/0086166 A1 | 4/2005 | Monk et al. | | |
| 2006/0174201 A1 | 8/2006 | Zaner-Godsey et al. | | |
| 2007/0016609 A1 | 1/2007 | Kim et al. | | |
| 2007/0073630 A1 | 3/2007 | Greene et al. | | |
| 2007/0156732 A1* | 7/2007 | Surendran et al. | | 707/101 |
| 2007/0156886 A1 | 7/2007 | Srivastava | | |
| 2007/0192855 A1 | 8/2007 | Hulten et al. | | |
| 2008/0082662 A1 | 4/2008 | Dandliker et al. | | |
| 2008/0189162 A1 | 8/2008 | Ganong et al. | | |
| 2008/0256211 A1* | 10/2008 | Shimizu | | 709/206 |
| 2008/0271143 A1 | 10/2008 | Stephens et al. | | |
| 2008/0307038 A1 | 12/2008 | Nichols et al. | | |
| 2009/0006366 A1 | 1/2009 | Johnson et al. | | |
| 2009/0013041 A1 | 1/2009 | Farmer et al. | | |
| 2009/0044264 A1 | 2/2009 | Ramanathan et al. | | |
| 2009/0077383 A1 | 3/2009 | De Monseignat et al. | | |
| 2009/0157830 A1* | 6/2009 | Kim | | 709/206 |
| 2009/0282265 A1 | 11/2009 | Aissi et al. | | |
| 2009/0327006 A1 | 12/2009 | Hansan et al. | | |
| 2009/0328008 A1 | 12/2009 | Mital et al. | | |
| 2010/0004965 A1 | 1/2010 | Eisen | | |
| 2010/0023447 A1 | 1/2010 | MacInnis | | |
| 2010/0024739 A1 | 2/2010 | Bakker | | |
| 2010/0057895 A1 | 3/2010 | Huang | | |
| 2010/0058058 A1 | 3/2010 | Busari | | |
| 2010/0094767 A1 | 4/2010 | Miltonberger | | |
| 2010/0115040 A1 | 5/2010 | Sargent et al. | | |
| 2010/0142401 A1* | 6/2010 | Morris | | 370/254 |
| 2010/0153325 A1 | 6/2010 | Amoroso et al. | | |
| 2010/0166533 A1 | 7/2010 | Hering | | |
| 2010/0205254 A1 | 8/2010 | Ham | | |
| 2010/0205259 A1 | 8/2010 | Vitaldevara et al. | | |
| 2010/0205665 A1 | 8/2010 | Komili et al. | | |
| 2010/0211997 A1 | 8/2010 | Mcgeehan et al. | | |
| 2010/0235367 A1* | 9/2010 | Chitiveli et al. | | 707/752 |
| 2010/0235625 A1 | 9/2010 | Pandey | | |
| 2010/0241739 A1 | 9/2010 | Reus et al. | | |
| 2010/0277997 A1 | 11/2010 | Kim | | |
| 2010/0318611 A1 | 12/2010 | Curtin et al. | | |
| 2010/0332428 A1 | 12/2010 | Mchenry et al. | | |
| 2011/0010304 A1* | 1/2011 | Chan Wong et al. | | 705/317 |
| 2011/0131131 A1 | 6/2011 | Griffin et al. | | |
| 2011/0191847 A1 | 8/2011 | Davis et al. | | |
| 2011/0191849 A1 | 8/2011 | Jayaraman et al. | | |
| 2011/0296003 A1 | 12/2011 | McCann et al. | | |
| 2012/0028606 A1 | 2/2012 | Bobotek | | |
| 2012/0166533 A1 | 6/2012 | Rubinstein et al. | | |
| 2012/0296965 A1 | 11/2012 | Srivastava | | |
| 2012/0297484 A1 | 11/2012 | Srivastava | | |
| 2013/0018972 A1 | 1/2013 | Sargent et al. | | |
| 2013/0036466 A1 | 2/2013 | Penta et al. | | |
| 2013/0189964 A1 | 7/2013 | Thompson | | |
| 2013/0189965 A1 | 7/2013 | Bonner | | |

OTHER PUBLICATIONS

Cignini, et al., "E-Mail on the Move: Categorization, Filtering, and Alerting on Mobile Devices with the ifMail Prototype", Retrieved at <<http://www.springerlink.com/content/9ewve0vp3e7xq6ft/fulltext.pdf>>, Mobile and Ubiquitous Info. Access Ws 2003, LNCS 2954, 2004, pp. 107-123.

"Microsoft Outlook 2007 Managing Email with Folders", Retrieved at <<http://lis.dickinson.edu/Technology/Training/Tutorials/ms2007/outlook/outlook_folders.pdf>>, pp. 5.

Yang, et al., "Email Categorization Using Fast Machine Learning Algorithms", Retrieved at <<http://www.springerlink.com/content/cvjuxvrjl1qtwe4v/fulltext.pdf>>, DS 2002, LNCS 2534, 2002, pp. 316-323.

Xia, et al., "An Agent for Semi-automatic Management of Emails", http://www.cs.cityu.edu.hk/~liuwy/publications/EmailAgent_APCHI.pdf, Dept. of Computer Science & Technology, Tsinghua University, Beijing 100084, China Dept. of Computer Science, City University of Hong Kong, Hong Kong SAR, China, pp. 1-8.

Fong, Philip W.L., "Preventing Sybil Attacks by Privilege Attenuation: A Design Principle for Social Network Systems", Retrieved at <<http://pages.cpsc.ucalgary.ca/~pwlfong/Pub/sp2011.pdf>>, Dec. 1, 2010, pp. 16.

Xu, et al., "Resisting Sybil Attack by Social Network and Network Clustering", Retrieved at <<http://ieeexplore.ieee.org/stamp/stamp.jsp?tp=&arnumber=5598178>>, Proceedings of the 10th Annual International Symposium on Applications and the Internet, Jul. 19-23, 2010, p. 15-21.

Wondracek, et al., "A Practical Attack to De-Anonymize Social Network Users", Retrieved at <<http://www.iseclab.org/papers/sonda-tr.pdf>>, Feb. 1, 2011, pp. 15.

Mislove, et al., "Ostra: Leveraging trust to thwart unwanted communication", Retrieved at <<http://www.mpi-sws.org/~gummadi/papers/ostra.pdf>>, Oct. 15, 2007, pp. 16.

Leung, et al., "Implementation of a Focused Social Networking Crawler", Retrieved at <<http://courses.ece.ubc.ca/412/term_project/reports/2009/focused_social_net_crawler.pdf>>, Retrieved Date: Apr. 14, 2011, pp. 1-6.

Ayodele, et al., "Email Classification and Summarization: A Machine Learning Approach", Retrieved at << http://userweb.port.ac.uk/~khusainr/papers/ccwmsn07_taiwo.pdf >>, IET Conference on Wireless, Mobile and Sensor Networks, Dec. 12-4, 2007, pp. 5.

Martin, et al., "Analyzing Behaviorial Features for Email Classification", Retrieved at << http://citeseerx.ist.psu.edu/viewdoc/download?doi=10.1.1.83.5285&rep=rep1&type=pdf >>,vol. 3 No. 2, Jul. 21, 2005, pp. 8.

Segal, et al., "MailCat: An Intelligent Assistant for Organizing E-Mail", Retrieved at << http://citeseerx.ist.psu.edu/viewdoc/download?doi=10.1.1.65.7439&rep=rep1&type=pdf >>, In Proceedings of the Third International Conference on Autonomous Agents, vol. 22 No. 4, 1999, pp. 8.

"G-Lock Email Processor 1.96", Retrieved at << http://www.freedownloadmanager.org/downloads/parse-incoming-mime-email-835962.html >>, Nov. 10, 2005, pp. 3.

Guan, et al., "Anomaly Based Malicious URL Detection in Instant Messaging", Retrieved at <<http://jwis2009.nsysu.edu.tw/location/paper/Anomaly%20Based%20Malicious%20URL%20Detection%20in%20Instant%20Messaging.pdf>>, The Fourth Joint Workshop on Information Security(JWIS), Aug. 6-7, 2009, pp. 1-14.

Gianvecchio, et al., "Measurement and Classification of Humans and Bots in Internet Chat", Retrieved at <<http://www.cs.wm.edu/~hnw/paper/security08.pdf>>, Proceedings of the 17th conference on Security symposium, 2008, pp. 15.

Bi, et al., "A Trust and Reputation based Anti-SPIM Method", Retrieved at <<http://ieeexplore.ieee.org/stamp/stamp.jsp?tp=

(56) References Cited

OTHER PUBLICATIONS

&arnumber=4509914>>, IEEE INFOCOM. The 27th Conference on Computer Communications. Apr. 13-18, 2008, pp. 371-375.
Trivedi, et al., "Analyzing Network and Content Characteristics of SPIM using Honeypots", Retrieved at <<http://www.trustedsource.org/download/research_publications/trivedi.pdf>>, Proceedings of the 3rd USENIX workshop on Steps to reducing unwanted traffic on the internet, 2007, pp. 9.
Benevenuto, et al., "Detecting Spammers on Twitter", Retrieved at <<http://ceas.cc/2010/papers/Paper%2021.pdf>>, Seventh Annual Collaboration Electronic Messaging, Anti-Abuse and Spam Conference, Jul. 13-14, 2010, pp. 9.
Xie, et al., "HoneyIM: Fast Detection and Suppression of Instant Messaging Malware in Enterprise-like Networks", Retrieved at <<http://www.foo.be/cours/dess-20072008/papers/154.pdf>>, Dec. 10-14, 2007, pp. 10.
Mayes, Brandon David, "Defending Against Malware in Online Social Networks", Retrieved at <<http://repository.lib.ncsu.edu/ir/bitstream/1840.16/6400/1/etd.pdf>>, 2010, pp. 65.
Aimeur, et al., "Towards a Privacy-enhanced Social Networking Site", Retrieved at <<http://ieeexplore.ieee.org/stamp/stamp.jsp?tp=&arnumber=5438097>>, International Conference on Availability, Reliability and Security, Feb. 15-18, 2010, p. 172-179.
"Improved network security with IP and DNS reputation"—Published Date: Jul. 2010 http://resources.idgenterprise.com/original/AST-0007839_IP_and_DNS_reputation_white_paper_-_4AA2-3535ENW.pdf.
Kwan "Trend Micro™ Smart Protection Network Web Reputation Service Architectural Overview"—Published Date: Nov. 2009 http://trendedge.trendmicro.com/pr/tm/te/document/SPN_and_WRS_Architecture_Overview_091112.pdf.
"Spam and Malware Protection" —Retrieved Date: Apr. 18, 2011 http://blog.bit.ly/post/263859706/spam-and-malware-protection.
"ThreatWatch™ IP Reputation Service from Security On-Demand"—Retrieved Date: Apr. 18, 2011 http://www.securityondemand.com/main/SolutionCenter/ThreatWatch.htm.
"ipTrust Unveils New IP Reputation Intelligence Service"—Retrieved Date: Apr. 18, 2011 http://www.securityweekcom/iptrust-unveils-new-ip-reputation-intelligence-service.
Costa, et al., "Extending Security-by-Contract with Quantitative Trust on Mobile Devices"—Published Date: Feb. 15-18, 2010 http://hal.archives-ouvertes.fr/docs/00/53/67/05/PDF/IMIS10.pdf.
Qian, et al., "Ensemble: Community-based anomaly detection for popular applications"—Published Date: Sep. 14-18, 2009 http://www.cse.umich.edu/~zmao/Papers/ensemble.pdf.
"Bridging the Gap between Data-Flow and Control-Flow Analysis for Anomaly Detection."—Published Date: Dec. 8-12, 2008 http://ieeexplore.ieee.org/stamp/samp.jsp?tp=&arnumber=4721575.
"Intrusion Detection via Static Analysis"—Published Date: May 14-16, 2001 http://ieeexplore.ieee.org/stamp/stamp.jsp?tp=&arnumber=924296.
"IE8 Security Part III: SmartScreen® Filter"—Retrieved Date: Apr. 15, 2011 http:/blogsmsdncombiearchive/2008/07/02/ie8-security-part-iii-smartscreen-filter.aspx.
Non-Final Office Action U.S. Appl. No. 13/110,202 dated Mar. 15, 2013, 23 pgs.
Reply Non-Final Office Action U.S. Appl. No. 13/110,202 dated Jun. 17, 2013, 13 pgs.
Non-Final Office Action U.S. Appl. No. 13/180,877 dated Apr. 1, 2013, 23 pgs.
Reply Non-Final Office Action U.S. Appl. No. 13/180,877 dated Jul. 1, 2013, 16 pgs.
Non-Final Office Action U.S. Appl. No. 13/110,174 dated Oct. 9, 2012, 13 pgs.
Reply Non-Final Office Action U.S. Appl. No. 13/110,174 dated Jan. 9, 2013, 12 pgs.
Final Office Action U.S. Appl. No. 13/110,174 dated May 10, 2013, 13 pgs.
Non-Final Office Action U.S. Appl. No. 13/195,245 dated Dec. 28, 2012, 35 pgs.
Reply Non-Final Office Action U.S. Appl. No. 13/195,245 dated Mar. 28, 2013, 13 pgs.
Final Office Action U.S. Appl. No. 13/195,245 dated May 10, 2013, 41 pgs.
Non-Final Office Action U.S. Appl. No. 13/180,838 dated Jun. 18, 2013, 30 pgs.
Wikipedia "Uniform Resource Locator—Wikipedia, the free encyclopedia", Jul. 14, 2011, reprinted from the Internet at: http://enwikipedia.org, 4 pgs.
Tyson Macaulay, Updated Aug. 2012, reprinted from the Internet at: http://www.tysonmacaulay.com/m 47 pgs.
Reply Final Office Action U.S. Appl. No. 13/110,174 dated Aug. 12, 2013, 14 pgs.
Reply Final Office Action U.S. Appl. No. 13/195,245 dated Aug. 12, 2013, 16 pgs.
Final Office Action U.S. Appl. No. 13/110,202 dated Oct. 10, 2013, 20 pgs.
Final Office Action U.S. Appl. No. 13/180,877 dated Oct. 24, 2013, 24 pgs.
Non-Final Office Action U.S. Appl. No. 13/195,245 dated Sep. 13, 2013, 52 pgs.
Reply Non-Final Office Action U.S. Appl. No. 13/180,838 dated Sep. 18, 2013, 12 pgs.
Final Office Action U.S. Appl. No. 13/180,838 dated Oct. 16, 2013, 29 pgs.

\* cited by examiner

EMAIL CHARACTERIZATION

BACKGROUND

Email users may feel overwhelmed by the amount of email they receive, and particularly by commercial emails that may come repeatedly from a sender. For example, an email user may sign up for weekly newsletters, social networking alerts, email purchase receipts, and/or other emails. Many current email clients that host email viewing user interfaces may contribute to the overload of emails by presenting emails in an uncategorized linear manner (e.g., organize by date received). Some email clients may allow rules to be manually setup to provide some organization; however manual setup is generally time consuming and/or otherwise frustrating to email users.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A technique for characterizing emails is disclosed herein. Email content and a domain identifier may be extracted from an email. The domain identifier may be used to determine a domain classification. In one example, the domain identifier may be used to query a domain directory service for domain classification data (e.g., a company name, a business category, a site name, a domain name description, etc.) associated with the domain identifier. The email may be characterized based upon the extracted email content and the domain classification. In one example, a pattern matching rule set may be executed upon the extracted email content and/or domain classification to determine a characterization which may be associated with the email. For example, an email may be characterized as "travel" based upon extracted email content (e.g., a subject line comprising the text "cruise") and a domain classification (e.g., "Travel Shop" company name, "vacations" business category, etc.).

A viewing panel having particular characterization related properties may be populated with an email based upon a characterization of the email. For example, a travel viewing panel may be populated with emails having a travel characteristic. Multiple viewing panels may be presented within a single environment. Respective viewing panels may display emails in a particular format based upon their characterization. For example, a travel email may be presented along with personal travel history, hot vacation suggestions, and/or departure and arrival times highlighted within the travel email. Within a viewing panel, bulk user commands may be executed upon multiple emails based upon a variety of conditions (e.g., delete all email from a particular sender). A pattern matching rule set (e.g., rules that may be executed upon a domain classification and/or extracted email content to determine a characterization) may be updated based upon user actions (e.g., dragging and dropping an email from a first viewing panel to a second viewing panel).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
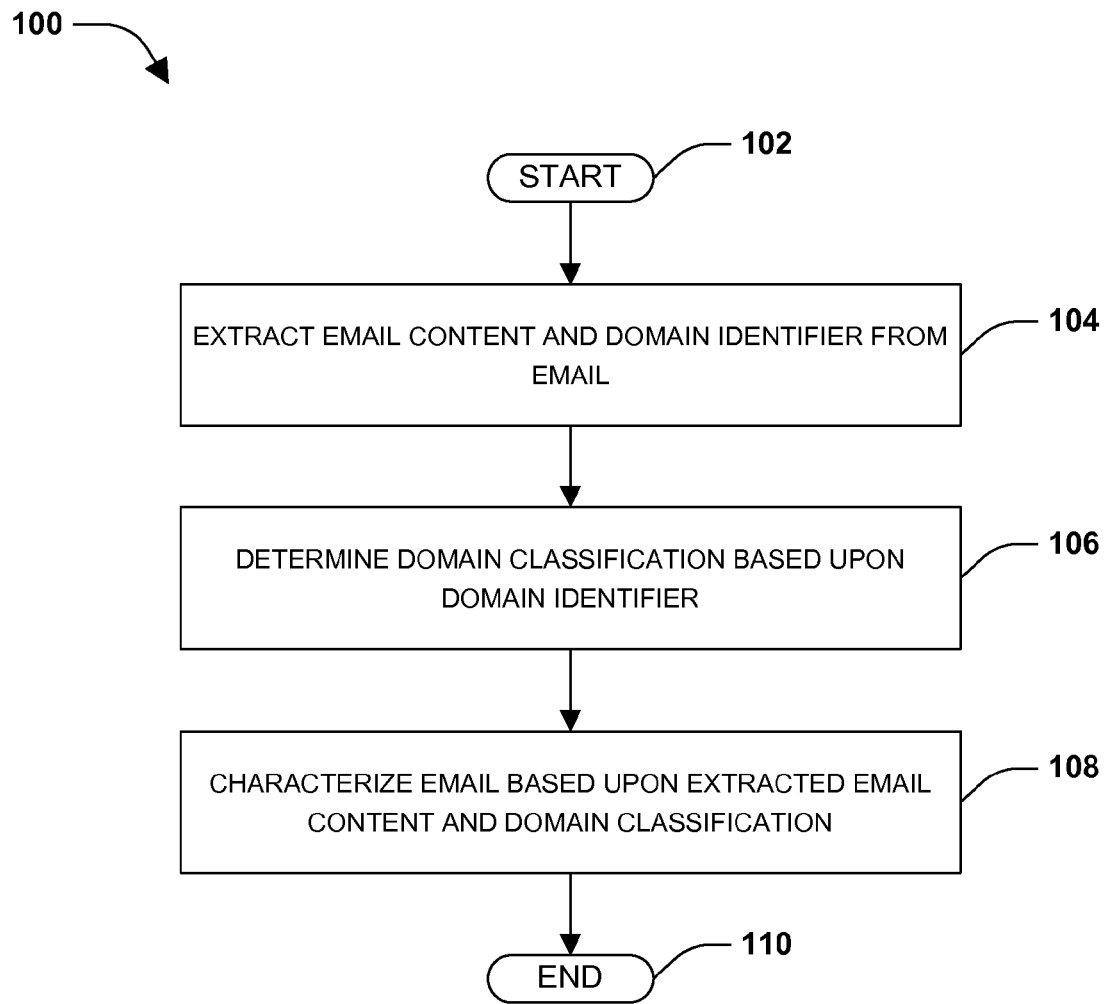
FIG. 1 is a flow chart illustrating an exemplary method of characterizing an email.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Email has become a prevalent means of communication. Unfortunately, the number of emails that a user receives can be overwhelming, and while there are some techniques for dealing with an (over)abundance of emails, these techniques require at least some manual intervention, that may be time consuming and/or otherwise frustrating to a user. For example, rules may be developed by a user, certain words may be blacklisted, folders can be created into which emails can be manually placed, etc.

Accordingly, as provided herein, a technique for characterizing an email is disclosed. Among other things, a domain identifier of the email is consulted and a domain classification is determined therefrom. The email is then characterized based upon the domain classification, among other things. It will be appreciated that this has particular application to solicited emails (e.g., opt-in bulk email, social networking email, mailing list email, commercial email, etc.). That is, those emails that are received by a user as a result of some commercial or other type of activity that the user is involved in, such as sales confirmation emails, etc., where the user has some interest in the emails but may not open or read them for a certain period of time (as opposed to unsolicited "spam" emails to which the user is significantly disinterested).

One embodiment of characterizing an email is illustrated by an exemplary method 100 in FIG. 1. At 102, the method begins. At 104, email content and a domain identifier may be extracted from an email. This data may be extracted from a header, fields, email text, metadata, and/other other data relating to the email. The extracted email content may comprise information, such as a sender name, a subject line and/or message text, for example.

At 106, a domain classification may be determined based upon the domain identifier. The domain identifier may comprise information relating to the domain name originating the email. Domain identifier variations may be created from the domain identifier because the extracted domain identifier may not directly correspond to the actual domain name of the sender. For example, a third party may have sent the email on behalf of the actual entity originating the email. In another example, the domain identifier may reflect a variation of the actual domain name of the entity sending the email.

In one example of determining a domain classification, a domain directory service (e.g., a database, a web service, an open directory categorizing domain names with business information, etc.) may be queried with the domain identifier and/or domain identifier variations to determine the domain classification. The domain classification may comprise a company name, a business category, a canonical site name, a domain name description, and/or other information corresponding to the domain identifier (e.g., a registered domain name).

At 108, the email may be characterized based upon the extracted email content and the domain classification. For example, a pattern matching rule set (e.g., an algorithm configured to match domain classifications and email content against patterns) may be executed upon the domain classification and the extracted email content to determine a characterization which may be assigned to or otherwise associated with the email. It will be appreciated that one or more characterizations (e.g., subcharacterizations) may likewise be associated with an email. For example, a second pattern matching rule set may be executed upon the extracted email content to determine a subcharacterization which may be associated with the email. It will be appreciated that a pattern matching rule set may be updated (e.g. the pattern matching rule set may learn from a user's actions) based upon user input. For example, a user may execute a viewing panel email swap (e.g., dragging and dropping an email from a first viewing panel to a second viewing panel) in which a pattern matching rule set may be updated to reflect the user's specified characterization for the particular email and/or sender that was swapped.

A viewing panel having particular characterization related properties with the email may be populated based upon the characterization. For example, a shopping viewing panel may be populated with an email characterized as shopping. It will be appreciated that an email within a particular viewing panel may be presented in a particular format based upon the characterization. For example, an email within a travel viewing panel may be presented with highlighted departure and arrival times within the email and/or with additional travel information (e.g., a map) (where a different viewing panel would not have these same properties). It may be appreciated that entity extraction may also be performed upon an email to extract additional information for display within a viewing panel. For example, entity extract may be performed upon text of an email to extract contextual information (e.g., a street address, an order confirmation number, an itinerary, a coupon amount, shipping information, etc.). The contextual information may be presented in association with the email and/or a particular viewing panel to provide an enriched view of the email for the particular context.

Within the viewing panel, one or more emails may be filtered based upon a filter. For example, all emails from a particular sender may be minimized. In another example, all emails outside of a particular date range (e.g., current month) may be minimized. Bulk user commands may be executed upon one or more emails within a viewing panel. For example, a user may delete all emails from a particular sender with a single click. At 110, the method ends.

Figure 2:
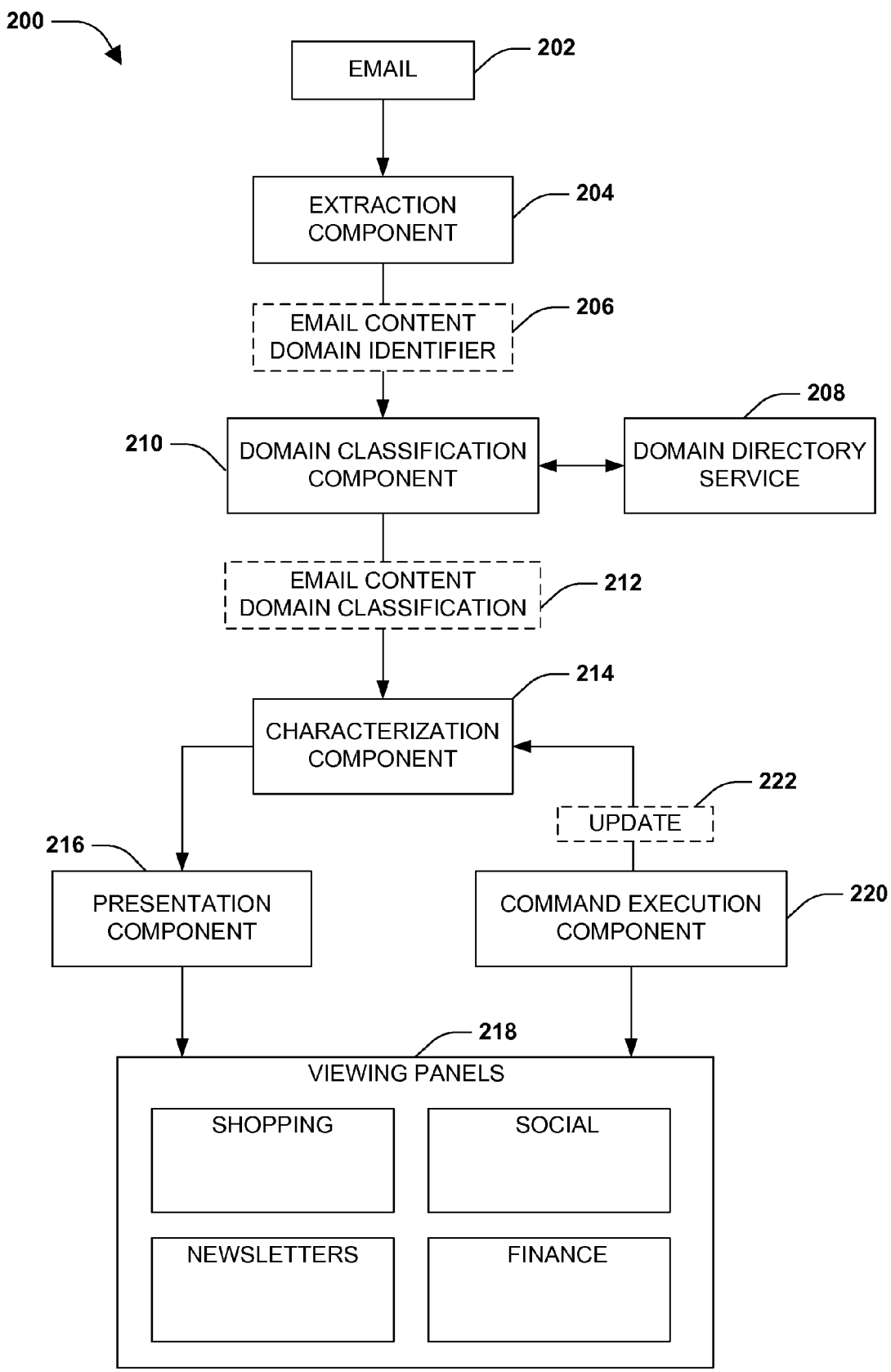
FIG. 2 is a component block diagram illustrating an exemplary system for characterizing an email.

FIG. 2 illustrates an example 200 of a system configured for characterizing emails. The system may comprise an extraction component 204, a domain classification component 210, and/or a characterization component 214. The system may also comprise a presentation component 216 and/or a command execution component 220.

The extraction component 204 may be configured to extract email content and a domain identifier 206 from an email 202. The domain classification component 210 may be configured to determine a domain classification based upon the domain identifier. The domain classification may comprise information related to the domain name from which the email was sent (e.g., business name of the sender, business category of the sender, website name of the sender, etc.). For example the domain classification component 210 may query a domain directory service 208 with the domain identifier to determine the domain classification. In another example the domain classification component 210 may be configured to create domain identifier variations based upon the domain identifier. The domain identifier and/or domain identifier variations may be used to query the domain directory service 208 to determine the domain classification.

The characterization component 214 may be configured to characterize the email 202 based upon the extracted email content and the domain classification (e.g., email content and domain classification 212). In one example, the characterization component 214 may be configured to execute a pattern matching rule set upon the domain classification and the extracted email content to determine the characterization which may be associated with the email 202. The pattern matching rule set may execute one or more pattern matching algorithms to match predefined patterns with the domain classification and the extracted email content. It will be appreciated that the characterization component 214 may be configured to characterize the email 202 with one or more characterizations (e.g., subcharacterizations).

The presentation component 216 may be configured to populate one or more viewing panels (e.g., set of viewing panels 218) with characterized emails. For example, the presentation component 216 may populate a viewing panel having a particular characterization related property (e.g., a newsletter characterization viewing panel) with an email (e.g., a newsletter email) based upon a characterization (e.g., newsletter) of the email. The presentation component 216 may be configured to present a characterized email within a viewing panel in a particular format based upon a characterization of the email and/or viewing panel. For example, an email within a shopping viewing panel may be presented with additional sales history and/or coupons, whereas an email within a travel viewing panel may be presented with itinerary information and/or a map.

The command execution component 220 may be configured to execute a bulk user command upon one or more emails within a viewing panel. For example, a user may delete all emails from a sender with a single user input (e.g., single click). In another example, a user may archive all emails from a sender with a single user input. In yet another example, one or more emails and/or senders may be swapped from a first viewing panel to a target viewing panel, in this way a user may recharacterize the swapped emails/senders to a characterization corresponding to the target viewing panel. The pattern matching rule set may be updated 222 based upon the swap. For example, patterns (e.g., predefined email content and/or domain classification data) may be updated to reflect the recharacterization.

Figure 3:
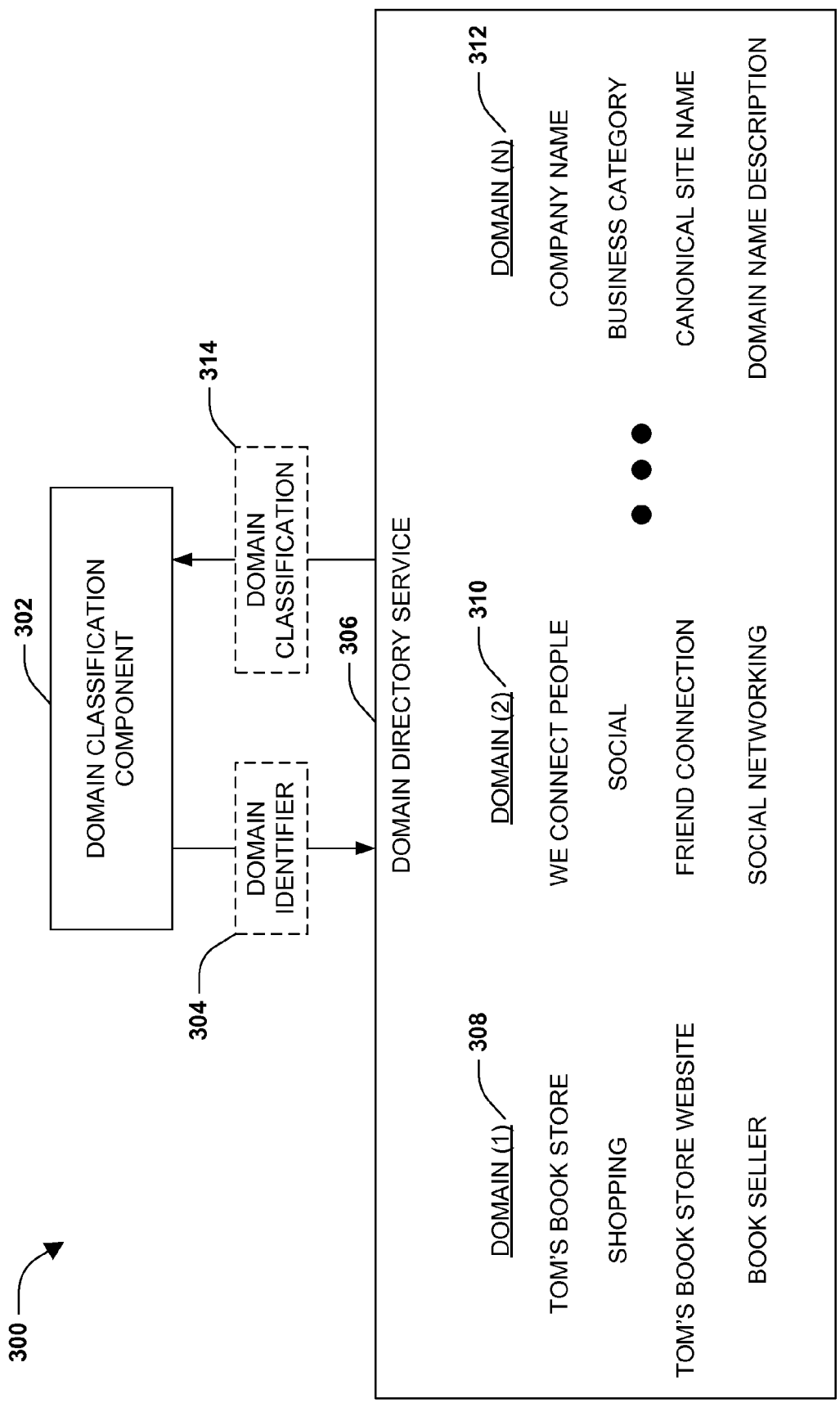
FIG. 3 is an illustration of an example of determining a domain classification based upon a domain identifier.

FIG. 3 illustrates an example 300 of determining a domain classification based upon a domain identifier. A domain classification component 302 may query a domain directory service 306 with a domain identifier 304. The domain identifier 304 may correspond to a domain name derived from normalizing extracted content of an email. The domain directory service 306 may comprise one or more domains (e.g., domain (1) 308, domain (2) 310, and domain (n) 312) and their respective domain classification information (e.g., company name, business category, canonical site name, domain name description, etc.).

A domain classification 314 may be determined based upon the queried domain identifier 304. For example, the domain identifier 304 may correspond to domain (1) 308 (e.g., a match in a domain name is determined). The domain classification 314 may be returned comprising the company name "Tom's book store", the business category "Shopping", the canonical site name "Tom's book store website", and/or the domain name description "Book seller". This information may be used to determine a characterization (e.g., Shopping) and/or one or more subcharacterizations (e.g., Books) corresponding to the email from which the domain identifier 304 was extracted.

Figure 4:
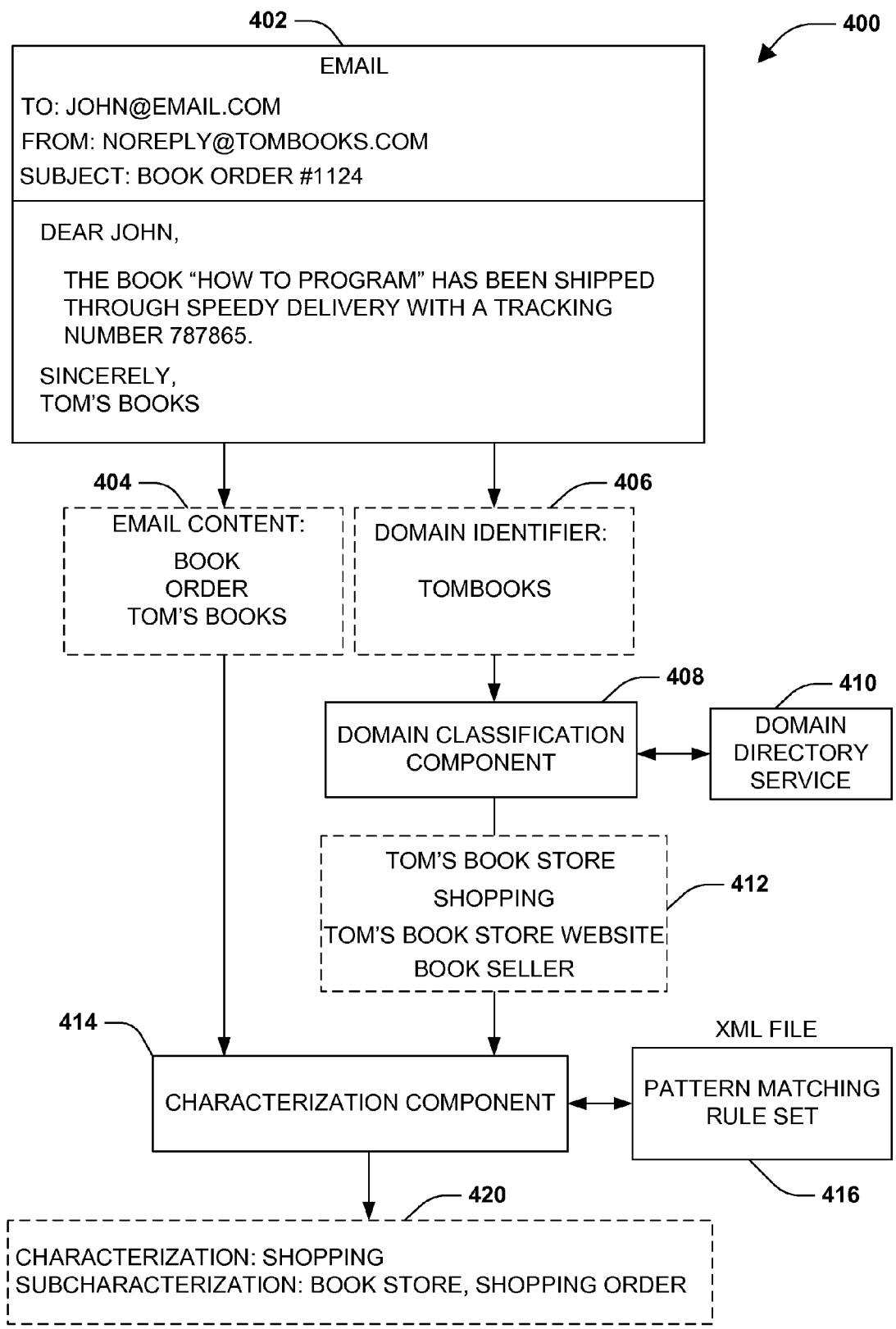
FIG. 4 is an illustration of an example of characterizing an email.

FIG. 4 illustrates an example 400 of characterizing an email. An email 402 regarding a recent book purchase from Tom's books may be received. Email content 404 may be extracted from the email 402. For example, "Book" and "Order" may be extracted from the subject and "Tom's Books" may be extracted from the message text. A domain identifier 406 may be extracted from the email 402. For example, "Tombooks" may be extracted from the sender address.

A domain classification component 408 may query a domain directory service 410 with the domain identifier 406 to determine a domain classification 412. For example, the domain name "Tombooks" may be registered with the domain directory service 410. The registration may provide additional information regarding the domain name "Tombooks", such as a company name "Tom's book store", a business category "Shopping", a site name "Tom's book store website", and/or a domain name description "Book seller". The domain classification 412 may be determined based upon the additional information.

A characterization component 414 may execute a pattern matching rule set 416 (e.g., an algorithm configured to compare extracted email content and a domain classification with characterization information within an XML file) upon the email content 404 and/or the domain classification 412 to determine a characterization and/or subcharacterization (e.g., characterization data 420). For example, the business category "Shopping" may match a characterization of "Shopping". Furthermore, "Shopping order" and "Book store" may be derived as subcharacterizations further describing the email 402. The characterization data 420 may be associated with the email 402.

The characterization component 414 may also be configured to perform entity extraction upon an email to extract additional information for display within a viewing panel. For example, entity extract may be performed upon text of an email to extract contextual information (e.g., a street address, an order confirmation number, an itinerary, coupon amounts, shipping information, etc.). The contextual information may be presented in association with the email and/or a particular viewing panel to provide an enriched view of the email for the particular context.

Figure 5:
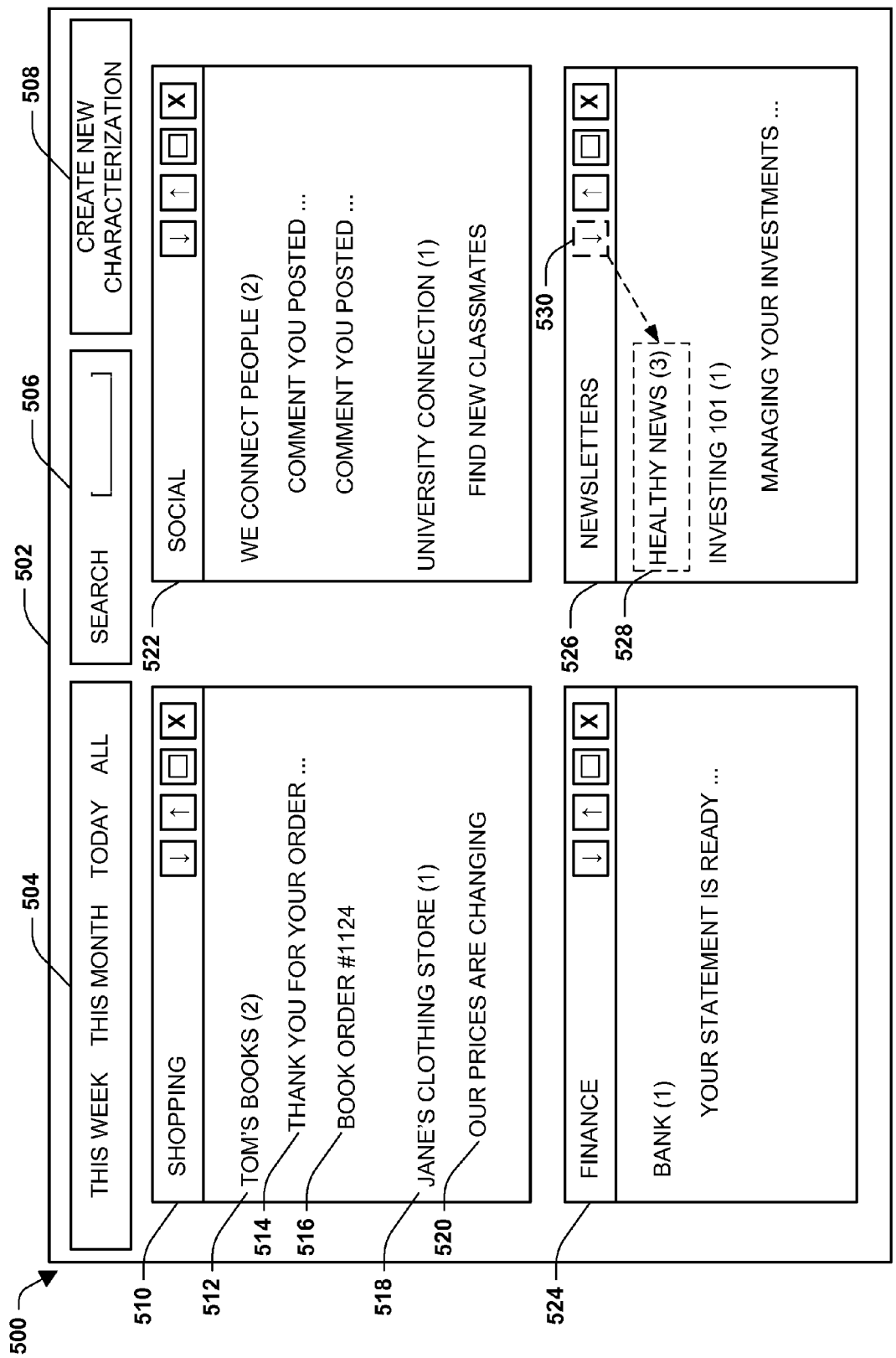
FIG. 5 is an illustration of an example of presenting one or more viewing panels.

FIG. 5 illustrates an example 500 of presenting one or more viewing panels. Within a computing environment 502, a shopping viewing panel 510, a social viewing panel 522, a finance viewing panel 524, and a newsletters viewing panel 526 may be presented. The computing environment 502 may comprise email management utilities, such as a date filter 504, a search filter 506, and/or a create new characterization button 508, for example.

The shopping viewing panel 510 may have particular characterization related properties relating to shopping. The shopping viewing panel 510 may present emails having a shopping characterization. For example, a first Tom's Books email 514 and a second Tom's Books email 516 may be presented under the Tom's Books company tab 512 within the shopping viewing panel 510 because the emails are characterized as shopping and are associated with the shopping company Tom's Books. The "(2)" next to the Tom's Books company tab 512 may indicate the number of emails associated with the shopping company Tom's books. Other emails having a shopping characterization, such as a first Jane's Clothing Store email 520, may be displayed within the shopping viewing panel 510. The first Jane's Clothing Store email 520 may be presented under a Jane's Clothing Store company tab 518.

The social viewing panel 522 may comprise emails having a social characterization. For example, the sender We Connect People may be characterized as social; therefore emails associated with We Connect People may be presented within the social viewing panel 522. The finance viewing panel 524 may comprise emails having a finance characterization. For example, the sender Bank may be characterized as financial; therefore emails associated with Bank may be presented within the finance viewing panel 524. The newsletters viewing panel 526 may comprise emails having a newsletters characterization. A minimize button 530 may be associated with the newsletters viewing panel 526. For example, a user may perform a bulk minimize upon emails associated with Healthy News. The Healthy News company tab 528 may be collapsed upon the emails associated with Healthy News (e.g., the Healthy News company tab 528 comprises 3 emails). It may be appreciated that a viewing panel may comprise one or more emails and/or company tabs corresponding to senders that may not be visually presented due to filters, searching, minimizing, and/or other constraints, for example.

The date filter 504 may be used to filter emails within one or more viewing panels based upon a date range (e.g., this week, this month, today, all). The search filter 506 may be used to filter emails within one or more viewing panels based upon a textual input. The create new characterization button 508 may be used to create a new characterization and/or a viewing panel having the new characterization. This provides flexibility in characterizing emails. For example, if a new characterization and new characterization viewing panel is created, then an email and/or sender may be swapped into the new characterization viewing panel. To adapt to the user's preference, a pattern matching rule set may be updated and/or trained to characterize emails as the new characterization.

Figure 6:
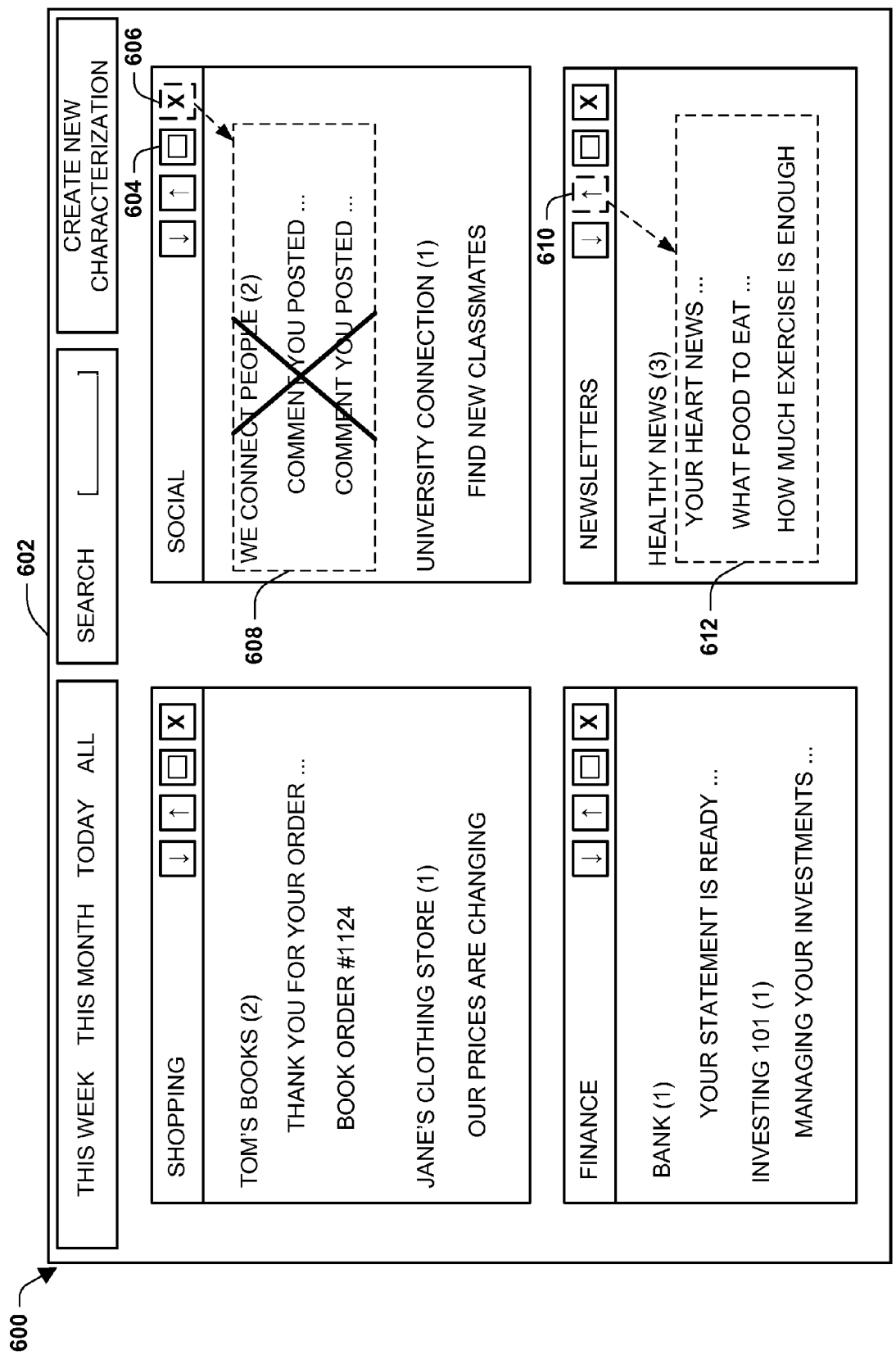
FIG. 6 is an illustration of an example of presenting one or more viewing panels.

FIG. 6 illustrates an example 600 of presenting one or more viewing panels. Within a computing environment 602, a shopping viewing panel, a social viewing panel, a finance viewing panel, and a newsletters viewing panel may be presented. An archive button 604 and a delete button 606 may be associated with the social viewing panel. The archive button 604 may be used to archive one or more emails within the social viewing panel. The delete button may be used to delete one or more emails within the social viewing panel. For example, the delete button 606 may be invoked to delete 608 all emails associated with the company We Connect People. This may allow a user to efficiently manage their email by performing bulk operations, such as delete. A maximize button 610 may be associated with the newsletter viewing panel. The maximize button 610 may be invoked to expand 612 a collapsed group of emails (e.g., three emails associated with Healthy News). This may allow a user to control the visual presentation of emails within viewing panels.

Figure 7:
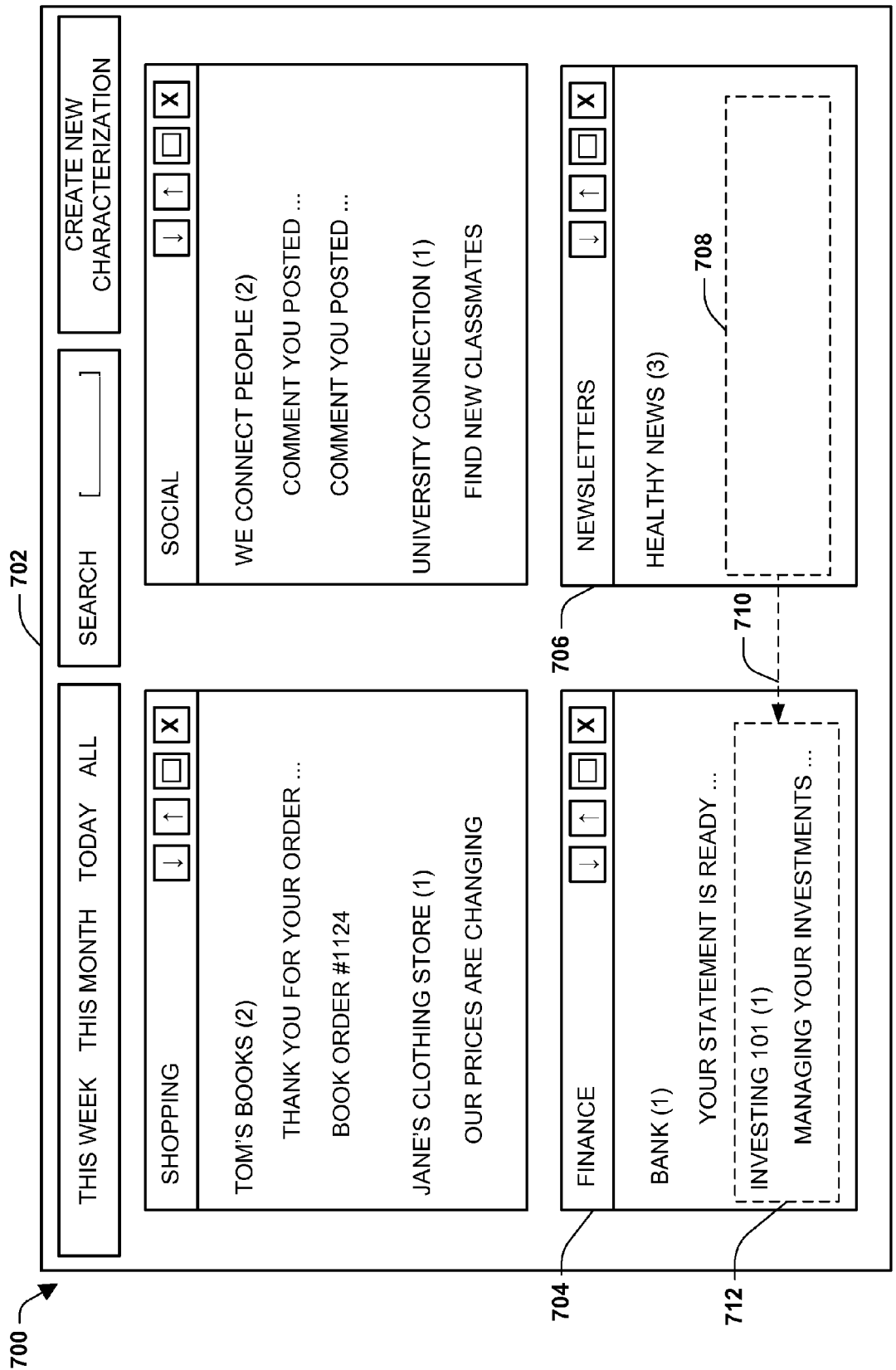
FIG. 7 is an illustration of an example of presenting one or more viewing panels.

FIG. 7 illustrates an example 700 of presenting one or more viewing panels. Within a computing environment 702, a shopping viewing panel, a social viewing panel, a finance viewing panel 704, and a newsletters viewing panel 706 may be presented. The newsletters viewing panel 706 may be configured to present emails having a newsletter characterization (e.g., email newsletters associated with Investing 101, email newsletters associated with Healthy News, etc.). A user may determine that emails from Investing 101 are more appropriately characterized as finance emails. The user may perform a view panel email swap 710, where the emails associated with Investing 101 may be dragged and dropped 712 into the finance viewing panel 704. This allows a user to recharacterize emails and/or senders (e.g., companies) to more appropriate characterization. A pattern matching rule set that may be utilized in characterizing emails may be updated based upon the viewing panel email swap 710, thus future emails from Investing 101 may be characterized as finance.

Figure 8:
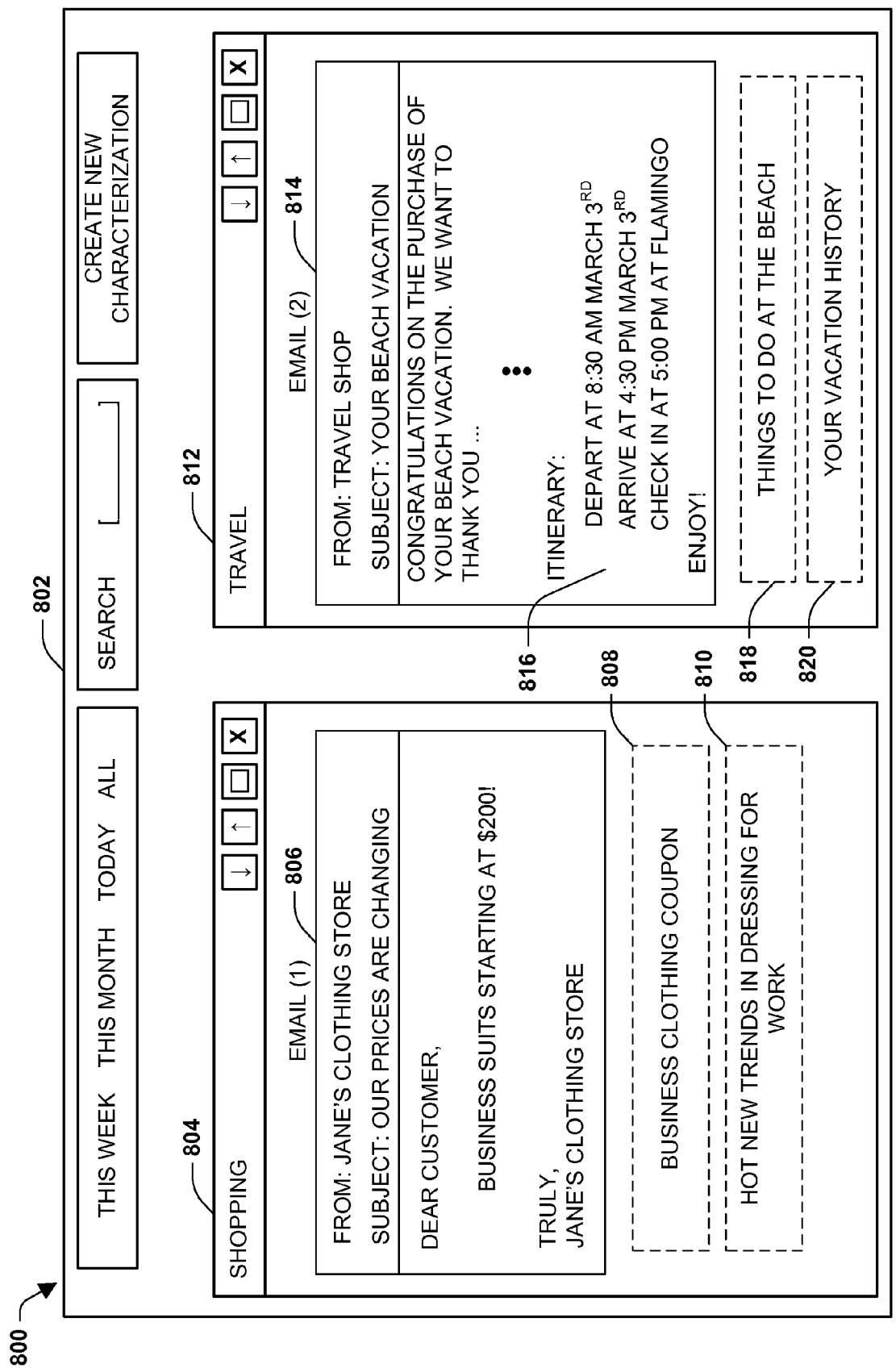
FIG. 8 is an illustration of an example of presenting one or more viewing panels.

FIG. 8 illustrates an example 800 of presenting one or more viewing panels. Within a computing environment 802, a shopping viewing panel 804 configured to present emails having a shopping characterization and a travel viewing panel 812 configure to present emails having a travel characterization may be presented. The shopping viewing panel 804 may have properties associated with the shopping characterization. For example, the shopping viewing panel 804 may present a shopping email 806 in a particular format based upon the shopping characterization. Shopping coupons 808 and information regarding shopping trends 810 may be presented, for example. The travel viewing panel 812 may have properties associated with the travel characterization. For example, the travel viewing panel 812 may present a travel email 814 in a particular format based upon the travel characterization. Text may be highlighted (e.g., itinerary text an 816 may be highlighted within the message of the email 814) and/or additional information may be presented (e.g., previous vacation data 820 and things to do at the beach information 818).

Figure 9:
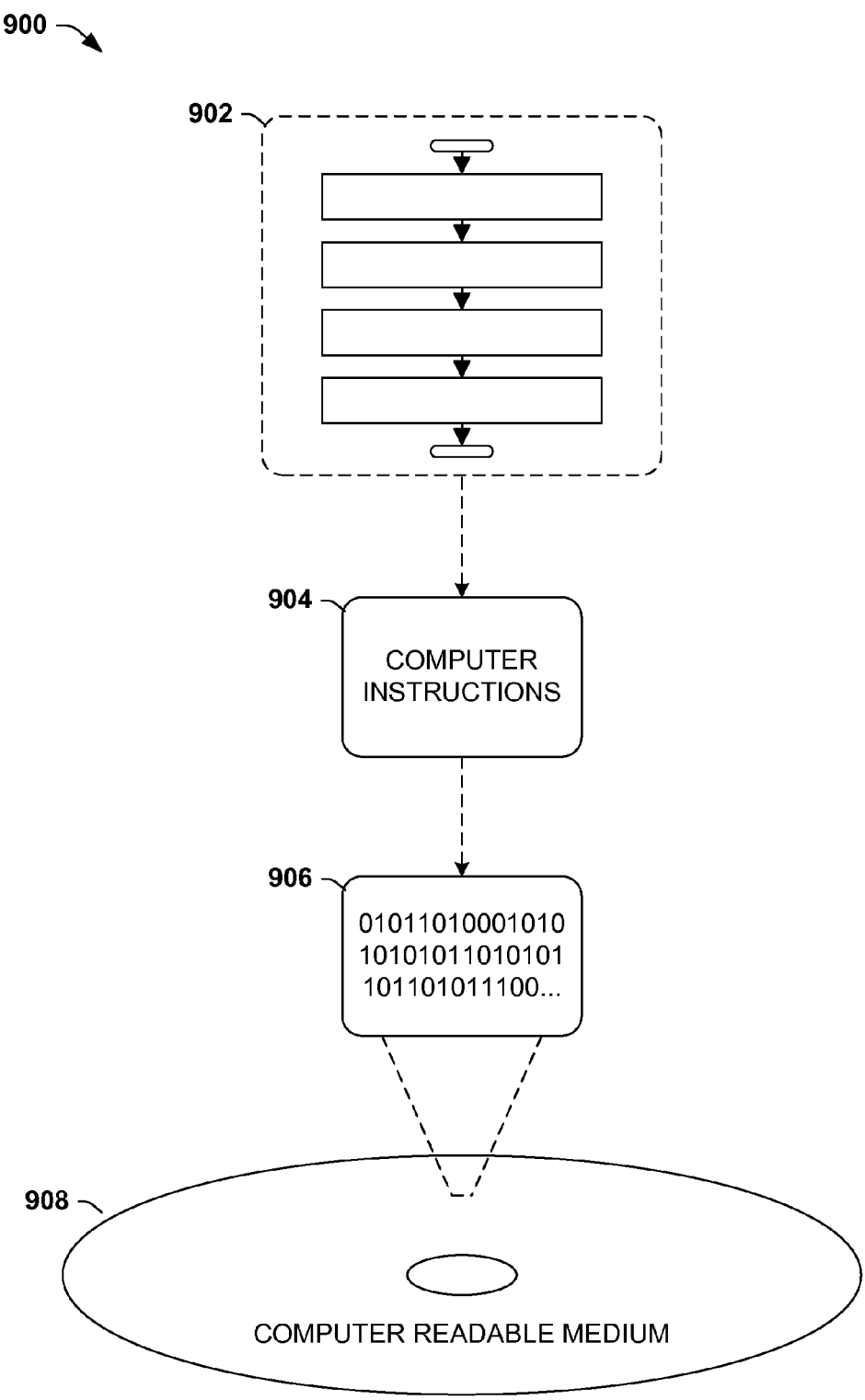
FIG. 9 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 904 configured to operate according to one or more of the principles set forth herein. In one such embodiment 900, the set of computer instructions 904 may be configured to perform a method 902, such as the exemplary method 100 of FIG. 1, for example. In another such embodiment, the set of computer instructions 904 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
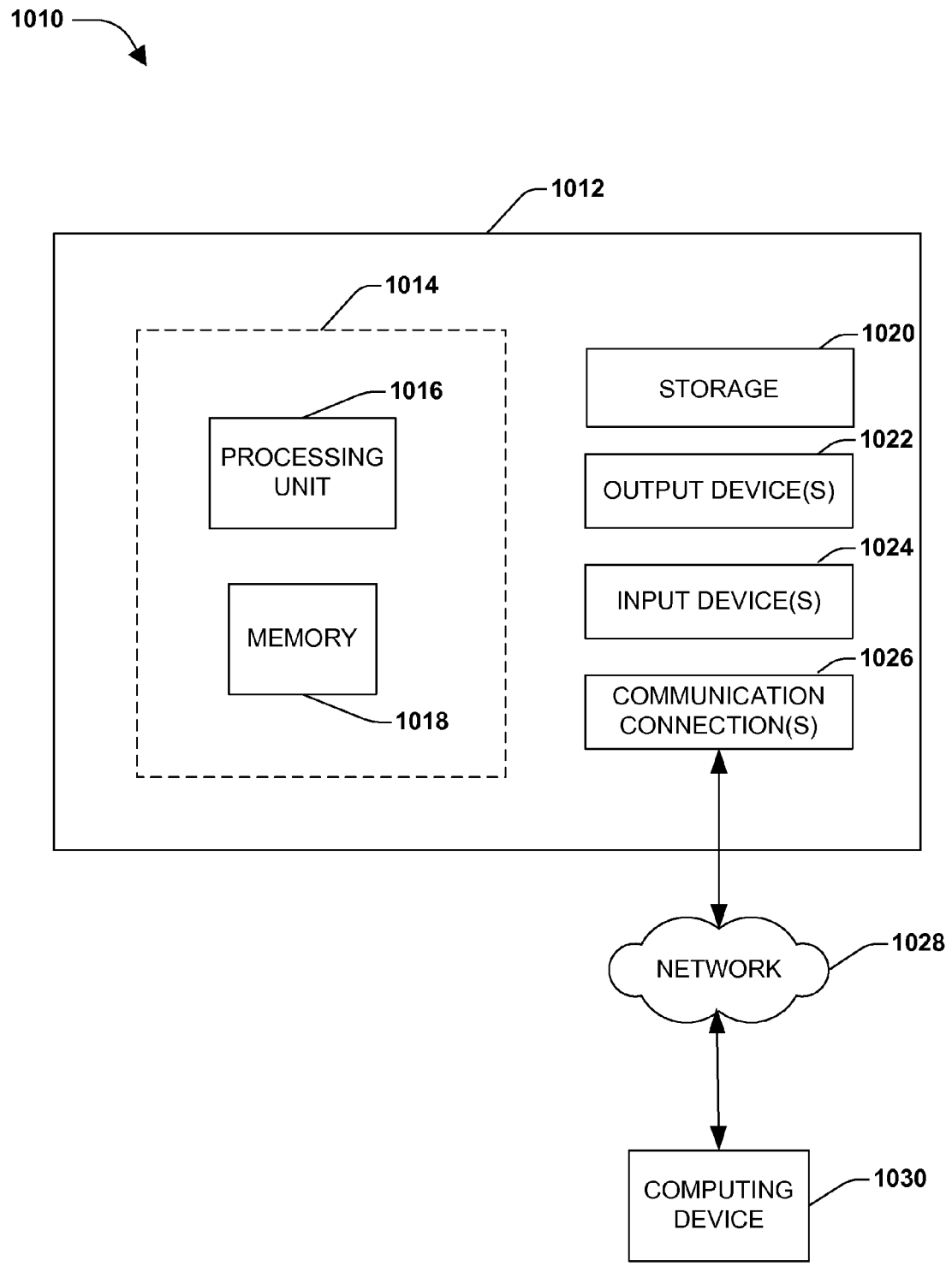
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such features may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for characterizing emails comprising:
extracting non-user tagged email content and a domain identifier from an email, the domain identifier merely comprising at least some of a domain of a sender of the email;
in response to sending the domain identifier extracted from the email to a domain directory service, receiving business information, from the domain directory service, that comprises at least one of a business name associated with the domain identifier, a business website associated with the domain identifier, or a business category associated with the domain identifier;
determining a domain classification associated with the email based upon the business information;
characterizing the email with a first characterization based upon executing a pattern matching rule set upon the extracted email content and the domain classification, the pattern matching rule set comprising a matching algorithm not predefined by the sender of the email;
extracting second non-user tagged email content and a second domain identifier from a second email, the second domain identifier merely comprising at least some of a second domain of a second sender of the second email;
in response to sending the second domain identifier extracted from the second email to a second domain directory service, receiving second business information, from the second domain directory service, that comprises at least one of a second business name associated with the second domain identifier, a second business website associated with the second domain identifier, or a second business category associated with the second domain identifier;
determining a second domain classification associated with the second email based upon the second business information;
characterizing the second email with a second characterization based upon executing a second pattern matching rule set upon the second extracted email content and the second domain classification, the second pattern matching rule set comprising a second matching algorithm not predefined by the second sender of the second email;
populating a viewing panel with at least an indication of the email based upon the first characterization;
populating merely the viewing panel with at least one of supplemental content or supplemental formatting based upon the first characterization but not populating one or more other viewing panels characterized with one or more other characterizations not comprising the first characterization with at least one of the supplemental content or the supplemental formatting;
populating a second viewing panel with at least an indication of the second email based upon the second characterization;
populating merely the second viewing panel with at least one of second supplemental content or second supplemental formatting based upon the second characterization but not populating one or more other viewing panels characterized with one or more other characterizations not comprising the second characterization with at least one of the second supplemental content or the second supplemental formatting; and
updating one or more rules of at least one of the pattern matching rule set or the second pattern matching rule set based upon a user dragging and dropping at least one of:
at least a representation of the email from the viewing panel to a viewing panel other than the viewing panel; or
at least a representation of the second email from the second viewing panel to a viewing panel other than the second viewing panel, at least some of the method implemented at least in part via a processing unit.

2. The method of claim 1, at least one of the supplemental formatting or the second supplemental formatting comprising highlighting.

3. The method of claim 1, at least one of the supplemental content or the second supplemental content comprising a map.

4. The method of claim 1, comprising executing a bulk user command upon one or more emails within at least one of the viewing panel or the second viewing panel.

5. The method of claim 1, at least one of the extracted email content or the second extracted email content comprising at least one of:
a sender name;
a subject line; or
message text.

6. The method of claim 1, comprising filtering one or more emails within at least one of the viewing panel or the second viewing panel based upon a filter.

7. The method of claim 1, comprising:
creating one or more domain identifier variations based upon at least one of the domain identifier or the second domain identifier; and
sending the one or more domain identifier variations to at least one of the domain directory service or the second domain directory service resulting in at least one of the received business information or the received second business information.

8. A system comprising:
one or more processing units; and
memory comprising instructions that when executed by at least some of the one or more processing units, perform a method for characterizing emails comprising:
extracting email content and a domain identifier from an email;
in response to sending the domain identifier extracted from the email to a domain directory service, receiving business information, from the domain directory service;
determining a domain classification associated with the email based upon the business information;
characterizing the email with a first characterization based upon executing a pattern matching rule set upon the extracted email content and the domain classification;
extracting second email content and a second domain identifier from a second email;
in response to sending the second domain identifier extracted from the second email to a second domain directory service, receiving second business information, from the second domain directory service;
determining a second domain classification associated with the second email based upon the second business information;
characterizing the second email with a second characterization based upon executing a second pattern matching rule set upon the second extracted email content and the second domain classification;
populating a viewing panel with at least an indication of the email based upon the first characterization;
populating merely the viewing panel with at least one of supplemental content or supplemental formatting based upon the first characterization but not populating one or more other viewing panels characterized with one or more other characterizations not comprising the first characterization with at least one of the supplemental content or the supplemental formatting;

populating a second viewing panel with at least an indication of the second email based upon the second characterization;

populating merely the second viewing panel with at least one of second supplemental content or second supplemental formatting based upon the second characterization but not populating one or more other viewing panels characterized with one or more other characterizations not comprising the second characterization with at least one of the second supplemental content or the second supplemental formatting; and updating one or more rules of at least one of the pattern matching rule set or the second pattern matching rule set based upon a user dragging and dropping at least one of:

at least a representation of the email from the viewing panel to a viewing panel other than the viewing panel; or at least a representation of the second email from the second viewing panel to a viewing panel other than the second viewing panel.

9. The system of claim 8, at least one of the supplemental formatting or the second supplemental formatting comprising highlighting.

10. The system of claim 8, at least one of the supplemental content or the second supplemental content comprising a map.

11. The system of claim 8, the method comprising executing a bulk user command upon one or more emails within at least one of the viewing panel or the second viewing panel.

12. The system of claim 8, at least one of the extracted email content or the second extracted email content comprising at least one of:
a sender name;
a subject line; or
message text.

13. The system of claim 8, the method comprising filtering one or more emails within at least one of the viewing panel or the second viewing panel based upon a filter.

14. The system of claim 8, the method comprising:
creating one or more domain identifier variations based upon at least one of the domain identifier or the second domain identifier; and
sending the one or more domain identifier variations to at least one of the domain directory service or the second domain directory service resulting in at least one of the received business information or the received second business information.

15. A computer readable storage memory excluding signals comprising instructions that when executed, perform a method for characterizing emails comprising:
extracting email content and a domain identifier from an email;
in response to sending the domain identifier extracted from the email to a domain directory service, receiving business information, from the domain directory service;
determining a domain classification associated with the email based upon the business information;
characterizing the email with a first characterization based upon executing a pattern matching rule set upon the extracted email content and the domain classification;
extracting second email content and a second domain identifier from a second email;

in response to sending the second domain identifier extracted from the second email to a second domain directory service, receiving second business information, from the second domain directory service;

determining a second domain classification associated with the second email based upon the second business information;

characterizing the second email with a second characterization based upon executing a second pattern matching rule set upon the second extracted email content and the second domain classification;

populating a viewing panel with at least an indication of the email based upon the first characterization;

populating merely the viewing panel with at least one of supplemental content or supplemental formatting based upon the first characterization but not populating one or more other viewing panels characterized with one or more other characterizations not comprising the first characterization with at least one of the supplemental content or the supplemental formatting;

populating a second viewing panel with at least an indication of the second email based upon the second characterization;

populating merely the second viewing panel with at least one of second supplemental content or second supplemental formatting based upon the second characterization but not populating one or more other viewing panels characterized with one or more other characterizations not comprising the second characterization with at least one of the second supplemental content or the second supplemental formatting; and updating one or more rules of at least one of the pattern matching rule set or the second pattern matching rule set based upon a user dragging and dropping at least one of:

at least a representation of the email from the viewing panel to a viewing panel other than the viewing panel; or at least a representation of the second email from the second viewing panel to a viewing panel other than the second viewing panel.

16. A computer readable storage memory excluding signals of claim 15, at least one of the supplemental formatting or the second supplemental formatting comprising highlighting.

17. A computer readable storage memory excluding signals of claim 15, at least one of the supplemental content or the second supplemental content comprising a map.

18. A computer readable storage memory excluding signals of claim 15, the method comprising executing a bulk user command upon one or more emails within at least one of the viewing panel or the second viewing panel.

19. A computer readable storage memory excluding signals of claim 15, at least one of the extracted email content or the second extracted email content comprising at least one of:
a sender name;
a subject line; or
message text.

20. A computer readable storage memory excluding signals of claim 15, the method comprising filtering one or more emails within at least one of the viewing panel or the second viewing panel based upon a filter.

* * * * *